March 28, 1961     L. MERTES     2,977,127
DEVICE FOR CLEANING PHONOGRAPH RECORDS, PARTICULARLY
SYNTHETIC RESIN PHONOGRAPH RECORDS
Filed April 9, 1956
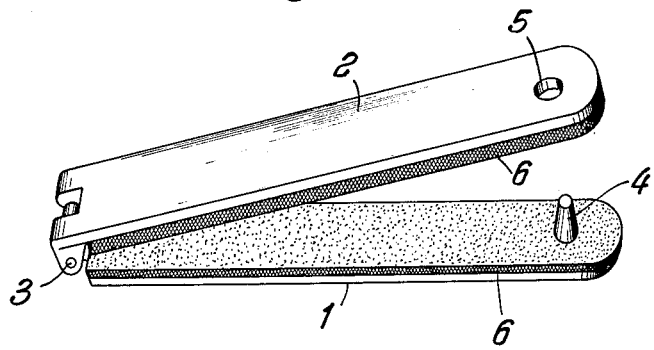
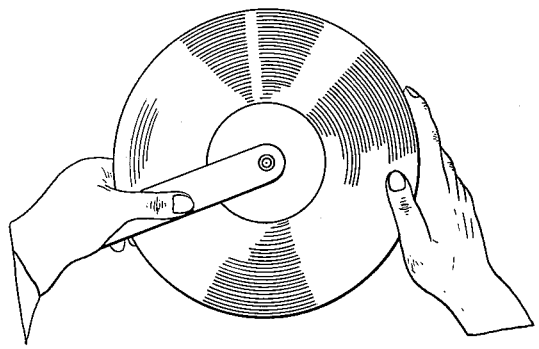
Inventor:
LEO MERTES
ATTORNEY

United States Patent Office

2,977,127
Patented Mar. 28, 1961

2,977,127

DEVICE FOR CLEANING PHONOGRAPH RECORDS, PARTICULARLY SYNTHETIC RESIN PHONOGRAPH RECORDS

Leo Mertes, 13 St. Josephstrasse, Saarbrucken, Germany

Filed Apr. 9, 1956, Ser. No. 577,089

Claims priority, application Germany May 24, 1955

3 Claims. (Cl. 274—47)

A device has been proposed for cleaning phonograph records, which consists of a wiper centred on the record. In particular, it has been recommended that this device should be constructed in the form of a double-armed, folding grip, one arm having at its free end a centering pin facing the second arm, and the second arm having an aperture for the passage of the centering pin. Both arms are provided on their facing surfaces with a cleaning pad. The advantage of such devices consists in that, as a result of the centering of the wiper on the phonograph record, the direction of wiping is practically always in the direction of the sound grooves. This ensures that the cleaning pad penetrates into the sound grooves and seizes dust deposits inside the grooves.

In the cleaning devices hitherto known, the wiper was generally provided with a velvet cover, and sometimes also with a fabric or leather pad. With this an effective cleaning of phonograph records made of shellac-like material could be achieved. It has not been possible, however, to clear of dust synthetic resin phonograph records with such cleaning device having a cleaning pad of velvet, fabric or leather. It is to be assumed that with synthetic resin phonograph records, the dust particles are predominantly held by static charges on the records.

The invention relates to a device for cleaning synthetic resin phonograph records, which is characterised in that a wiper, which can be centred on the record, is provided on the surface facing the record with a cleaning pad which wipes out the electro-static charges on the record. As a result of the centering of the wiper, the direction of wiping in the direction of the sound grooves is retained, which is important in order to achieve effective cleaning. As a result of the removal of electrostatic charges on the record, the force is eliminated which is primarily responsible for retaining the dust particles on the record.

The removal of the electrostatic charge smiultaneously reduces the settling of dust particles from the air, because the attractive forces acting on the suspended particles of dust are practically eliminated.

There are numerous possibilities available for the construction of the cleaning pad. A very effective cleaning can be achieved by using a pad consisting of a resilient layer of synthetic resin foam material. A foam material of polyurethane has proved particularly suitable for this. An increase in the cleaning effect is obtained by providing the pad consisting of synthetic resin foam material with a long-lasting moisture impregnation. Liquids which evaporate but slowly and accordingly are retained for a long time in the cleaning pad are suitable for this long-lasting moisture impregnation. For example, mixtures of alkyl-sulphonates which are produced from mineral oil and can be used as neutral washing agents combinable with soap, and glycerine have proved advantageous. A wiper covering impregnated with such a moistening mixture remains moist for a very long time, particularly if the cleaning device is kept closed. It has been observed that the moistening agent not only aids the cleaning effect but also contributes to preventing a static charge on the record of synthetic material. This effect of preventing the setting up of a charge or of cancelling a charge is so great that it is not necessary to use the charge-removing property of synthetic resin foam material. This means that, if a suitable moisture impregnation is used, the covering needs no longer consist of a synthetic resin foam material but may consist of other materials. Pads of soft absorbent material, e.g. fibrous material or leather, are suitable for this purpose. Pads of absorbent woven fabric or pads of an absorbent layer of velvet may also be used.

The above-mentioned construction in the form of a double-armed folding grip is particularly to be recommended for the device according to the invention, wherein both arms of the grip carry pads suitable for removing electrostatic charges of the record, and are joined together in the closed position at their free ends by means of a centering pin which is fixed to the one arm and engages the other arm through an aperture.

An embodiment of the invention is illustrated by way of example in the drawings.

Fig. 1 shows a perspective view of the cleaning device according to the invention. The device consists of two arms 1 and 2, which are hinged together at 3, so that they form a folding grip. The arm 1 is provided with a centering pin 3 which points towards the arm 2. The arm 2 is provided with an aperture 5 which lies opposite the centering pin 4 and through which the centering pin can pass when the grip is closed.

On the surfaces facing one another, the two arms 1 and 2 are covered with a pad 6 of resilient synthetic resin foam.

Use of the device is illustrated in Fig. 2. According to this, after the grip has been opened, a phonograph record is placed between the arms and the centering pin 4 is passed through the centre hole in the record. Then the grip can be closed, i.e. the upper arm 2 can be pressed against the upper surface of the phonograph record, the centering pin engaging in the aperture 5 in the arm 2. The phonograph record can be turned in the closed grip whereupon the pads of synthetic resin foam sweep over and clean the grooved areas on the top and bottom of the record.

The device can also be used for cleaning records on one side by placing the records on the turntable of a playing apparatus and then placing the arm 2 over the spindle of the turntable. This use of the device is made possible by the fact that the lower arm 1 can be opened out so far that it lies substantially in the extension of the upper arm 2.

When a moist cleaning is used, the pads 6 are provided with a long-lasting moisture impregnation, for which liquid mixtures which are difficult to evaporate and which have a cleaning action may be used.

What I claim is:

1. A device for simultaneously cleaning both sides of phonograph records, particularly records of synthetic resin having microgroove recording thereon, comprising a pair of elongated flat bases, a hinge pivoting the two bases to each other at one end so that the bases may lie aligned upon each other, an aperture in the free end region of one base, a projection at the free end of the other base and adapted freely to enter the aperture when the bases lie on each other, the projection being of a diameter less than the inner diameter of the standardized central aperture of phonograph records, the distance between the base end aperture and the hinge being at least equal to the radius of the records to be cleaned, a pad of absorbent and resilient synthetic resin foam on each base, the pads facing each other, and a liquid impregnant in each pad of low evaporation tendency and capable of removing electrostatic charge from the record.

2. The device of claim 1 in which each pad is of polyurethane foam.

3. The device of claim 2 in which each pad is of polyurethane and a liquid of low evaporation characteristic and capable of removing electrostatic charges from the record impregnates the pad.

References Cited in the file of this patent

UNITED STATES PATENTS

| | | |
|---|---|---|
| 1,261,688 | Bratherton | Apr. 2, 1918 |
| 1,318,145 | Harbaugh | Oct. 7, 1919 |
| 2,084,485 | Fink | June 22, 1937 |
| 2,804,636 | Sadler | Sept. 3, 1957 |
| 2,819,484 | Fouse | Jan. 14, 1958 |

OTHER REFERENCES

Modern Plastics, November 1954, vol. 32, #3, page 106.

Modern Plastics, August 1955, vol. 32, #12, pages 102–104.

Wireless World, January 1955, pages 27 and 28.

Audio, July 1956, page 36.